United States Patent [19]

Poliak et al.

[11] 4,441,938

[45] Apr. 10, 1984

[54] SOLDERING FLUX

[75] Inventors: Richard M. Poliak, Endwell; Dennis L. Rivenburgh, Endicott; Carlos J. Sambucetti, Croton-on-Hudson, all of N.Y.

[73] Assignee: International Business Machines Corporation, Armonk, N.Y.

[21] Appl. No.: 480,158

[22] Filed: Mar. 29, 1983

[51] Int. Cl.$^3$ ............................................. B23K 35/34
[52] U.S. Cl. ........................................ 148/23; 148/24; 148/25
[58] Field of Search ..................................... 148/23–25

[56] References Cited

U.S. PATENT DOCUMENTS 3,459,606  8/1969  Becker .................................. 148/23
3,730,782  5/1973  Poliak .................................. 148/25

*Primary Examiner*—Peter D. Rosenberg
*Attorney, Agent, or Firm*—Pollock, Vande Sande & Priddy

[57] ABSTRACT

A soldering flux comprising of rosin, certain acetic acid derivatives, ionic fluorocarbon surfactant, and organic diluent.

20 Claims, No Drawings

SOLDERING FLUX

DESCRIPTION

1. Technical Field

The present invention is concerned with soldering fluxes and their use in processes for soldering members and particularly, metallic members together. The flux compositions of the present invention are particularly suitable for use in the field of microelectronics such as in the preparation of integrated circuit modules.

2. Background Art

During the preparation of integrated circuit modules, input/output (I/O) pins are inserted into the substrate. The input/output pins provide the needed electrical connections to the integrated circuit chip or chips which are subsequently connected to the substrate or carrier. When the module is to be connected to a printed circuit board by a soldering process, solder flux compositions have been applied to the pins. Flux compositions are employed to remove oxides from the pins and to prevent the pins from oxidizing when subjected to elevated temperatures for soldering and thereby serving to maintain the electrical conductivity of the pins. Once the solder is applied, any flux composition or residue therefrom (e.g., polymerized species) remaining on the pins and substrates must be removed to provide as clean a substrate as possible. In addition, the substrate usually includes, at preselected areas, certain metals, such as copper and/or chrome to provide the desired metallurgical pattern on the substrate.

Integrated circuit chips are attached to the integrated circuit substrate or carrier by applying solder to preselected areas on the substrate which is generally referred to in the art as the chip pad area. Such areas can be defined, for instance, by providing pre-selected exposed areas of a metal which will accept the solder, such as copper. In addition, a flux composition would normally be applied to the substrate to facilitate the application of solder to the chip pad area. After solder is applied to the chip-pad area, any flux and/or flux residue must be removed prior to attaching the integrated circuit chip so as to provide as clean a module as possible.

The ability to thoroughly remove flux residues is extremely desirable, if not essential, when processing integrated circuit carriers. Many of these fluxes are, however, somewhat corrosive. In the environment of microelectronics, corrosion from any residual flux can ruin extremely costly electronic devices. In fact, many of the organic water soluble fluxes contain corrosive materials such as halides. A flux composition which contains free halogen can result in conversion to hydroacids and the corresponding halide ions by hydrolysis at the soldering temperature. Hydroacids can further react with organic materials present in the flux to free halide ions, for instance, organic acids such as citric and tartaric acids which are sometimes present in fluxes. Accordingly, if the flux residue is not entirely removed, this will lead to corrosion of the parts soldered.

An inherent problem with many prior art activated rosin flux residues has been the difficulty of adequate removal of corrosive agents or activators. For instance, to remove many prior art flux residues, it is necessary to employ a hot water rinse in combination with neutralization or a 2% hydrochloric acid solution in combination with a hot water rinse and neutralization or to use many specialized water-based detergents. This is primarily due to the fact that various prior fluxes have two types of residue, i.e., an organic solvent-soluble rosin residue and a water-soluble activator residue.

Soldering in the microelectronic environment, such as printed circuit soldering has, in the past, employed non-activated rosin fluxes in order to provide a flux which would yield an entirely non-corrosive and non-conductive residue. However, pure rosin alone is limited in oxide removal capability and usually requires solder rework to produce good product yields.

To improve rosin flux oxide removal capability, activators are added to the flux composition.

Typical activators included in such flux composition are acids, bases, and salts. However, as apparent, if such are not completely removed they are potentially a source of corrosion.

U.S. Pat. Nos. 2,715,084; 3,478,414; and 4,168,996 are of interest with respect to flux compositions containing rosin.

In recent years significant improved flux compositions based on non-activated rosin compositions have been developed, and particularly those disclosed in U.S. Pat. No. 3,730,782 to Poliak, et al.

DESCRIPTION OF INVENTION

According to the present invention, improved oxide removal and, consequently, reduced solder defects and reduction of rework cycles are achieved. Moreover, the residue from the flux compositions of the present invention are readily removable during the cleaning procedure. The flux compositions of the present invention provide improved wetting of the copper metal surfaces. The solder flux compositions of the present invention contain:

about 40 to about 60% by weight of rosin; about 0.01 to about 1% by weight of an ionic fluorocarbon;

about 1 to about 10% by weight of a compound selected from the group of ethylene diamine tetracetic acid, sodium salt of tetraacetic acid, diethylene triamine pentaacetic acid, sodium salt of said pentacetic acid, or mixtures thereof; and the remainder (e.g., about 39 to about 59% by weight) of at least one water-soluble organic diluent.

DESCRIPTION OF PREFERRED AND VARIOUS MODES FOR CARRYING OUT INVENTION

The flux compositions of the present invention are non-activated rosin flux compositions. In the context of the present invention the term "non-activated" implies that the flux is no more corrosive nor conductive than the rosin residue alone. Typically, non-activated fluxes are used in the soldering of a read-write lead assembly. Solder iron temperatures of about 450° to about 600° F. are used with no cleaning.

A further use for the non-activated fluxes is in the formation of multilayer electronic board assemblies where the complete removal of flux residue is not possible. In this type of operation, oven soldering is used and the portions which can be cleaned are cleaned in a freon-isopropyl alcohol cleaning solution.

Another area wherein non-activated fluxes find particular application is in device chip soldering, where complete residue removal is desirable and reliability is a primary factor. Hot gas oven soldering is used with cleaning in an azeotrope of an aliphatic alcohol and chlorothene.

The rosin employed in the flux compositions of the present invention is preferably water-white rosin. Water-white rosin is a known material and chemically is a mixture of several compounds. While the specific composition of the individual rosin utilized will vary, depending upon the raw material source, water-white rosin can generally be typified as a mixture of isomeric diterpene acids. The three major components are abietic, D-pimaric acid, and L-pimaric acid. An "average" rosin will contain up to about 80-90% by weight abietic acid with the pimaric acids comprising about 10 to about 15% by weight. The designation "water-white rosin" refers to a grade of rosin determined by colorimetric methods. Along these lines see ASTM Designation D509-55. The properties of water-white rosin are discussed in "Solders and Soldering", McGraw-Hill, H. Manko, disclosure of which is incorporated herein by reference. Representative commercial suppliers of water-white rosin are Filtered Rosin Products (N,WG, and WW Gum Rosin) and the Taylor-Lowenstein Co. (N,WG, and WW Gum Rosin).

In addition, to water-white rosin, other rosins such as hydrogenated wood rosin and polymerized-dimerized rosin can be employed. However, water-white rosin is preferred to the other rosins.

Some types of rosins should be avoided in the preparation in the flux compositions of the present invention. For instance, rosins which are incompatible with the other flux components, i.e., the organic diluents or cationic fluorocarbon surfactant, or metal salt should be avoided. In addition, a rosin which would be unsuitable at the fluxing temperatures should, of course, be avoided. Such rosins to be avoided can be readily determined by persons skilled in the art once they are aware of the present disclosure.

The rosin is employed in the compositions of the present invention in amounts of about 40 to about 60% by weight.

The compositions of the present invention also contain an ionic fluorocarbon surfactant and preferably a cationic fluorocarbon surfactant. Those ionic fluorocarbon surfactants disclosed in U.S. Pat. No. 3,730,782 are suitable in the compositions of the present invention, disclosure of which is incorporated herein by reference. A fluorocarbon surface-active agent, as the term is employed according to the present invention, is an organic material that contains the element fluorine and a solubilizing group in its structure. The term "solubilizing group" is used to denote any moiety which would provide the surface-active agent with water solubility and-/or oil solubility and ionic characteristics.

The ionic fluorocarbon surfactants of the present invention contain the recurring unit ($CF_2$), and can generally be represented by the formula:

$$Y(CF_2)pX$$

wherein X is a solubilizing group as will be defined hereinbelow, Y is a moiety required to complete the fluorocarbon chain such as H or F, and p is a positive integer.

The solubilizing portion consists of any group which will have an anionic or preferably a cationic character. The term "cationic character" refers to the positive charge carried by the solubilizing group; whereas, the term "anionic character" refers to the negative charge carried by the solubilizing group. The ionic fluorocarbon surfactants used in this invention can thus be viewed as a molecule, one end of which is a solubilizing functional group, while the other end consists of a fluorocarbon group containing a minimum of four carbon atoms.

Any ionic fluorocarbon surfactant which meets the above qualifications can be used with varying degrees of success in the compositions of the present invention.

Generally, representative preferred cationic fluorocarbon surfactants comprise quaternary ammonium fluorocarbon compounds, ammonium fluorocarboxylates, and perfluorocarboxylic acids.

The quaternary ammonium cationic fluorocarbon surfactants can be represented by the formula:

$$C_nF_{2n+1}CONHC_3H_6N(CH_3)_qC_rH_{2r+1}X$$

where n is preferably from 6 to 9, q is 2 or 3, and r is 0 to 2. X represents a halide. Two specific examples of materials within the above class are:

$$C_7F_{15}CONHC_3H_6N(CH_3)_2C_2H_5Cl; \text{ and}$$

$$\underbrace{C_7F_{15}CONHC_3H_6}_{R_f}\underbrace{N(CH_3)_3I}_{R_H}$$

The $R_f$ or fluorocarbon portion may be chosen to give the desired properties for effective surface treatment, i.e., the desired surface tension of the flux to optimize solder wetting properties.

A preferred surfactant employed is FC-134, available from the 3M Corporation. Such has the following formula:

$$F(CF_2)_7CONHC_3H_6N(C_2H_5)_2CH_3I$$

Another group of ionic fluorocarbon surfactants include the C-9 and C-11 ammonium fluorocarboxylates having the formula:

$$H(CF_2)_nCOONH_4$$

where n equals 8 or 10.

Another group of ionic fluorocarbon surfactants include the perfluorocarboxylic acids in which the carbon chain of the hydrophobic group is completely fluorinated except for one terminal hydrogen atom. Such compounds can be represented by the formula:

$$HCF_2(CF_2)_sCOOH$$

wherein s is 5-8. Moreover, metal salts thereof can be employed.

The ionic surfactants are employed in the compositions of the present invention in amounts of about 0.1 to about 1% by weight.

In addition, the compositions of the present invention, in order to provide the improved property such as improved wetting of the copper in order to more effectively remove oxide, improved solubility of the flux residues to insure more effective cleaning after soldering must contain ethylene diamine tetraacetic acid and-/or diethylene triamine pentaacetic acid, and/or sodium salt thereof. Examples of suitable compounds are disodium ethylenediamine tetraacetic acid, trisodium ethylenediaminetriacetic acid, tetrasodium ethylenediamine tetraacetate, pentasodium diethylenetriamine pentaacetate, ethylenediaminetetraacetic acid, and diethylenetriamine pentaacetic acid. The preferred compounds employed are disodium ethylenediamine tetraacetic acid and pentasodium diethylene triamine pentaacetic acid.

U.S. Pat. No. 4,000,016 to Lazzarini, et al. suggests the use of the above compounds in flux compositions which contain glycerol as the fluxing component. However, the function and use of these acetic acid derivatives in conjunction with the rosin and ionic surface-active agent function in a manner quite differently than with glycerol. In addition, various other "chelating" agents, other than the specific compounds required by the present invention, have been suggested for certain purposes in certain specific types of solder flux compositions. Along these lines see U.S. Pat. Nos. 3,740,831; 3,814,638; and 3,832,242.

The diethylenetriaminetetraacetic acid and/or ethylenediaminetetraacetic acid and/or sodium salt thereof is employed in amounts of about 1 to about 10% by weight of the composition. Mixtures of these compounds can be employed, if desired.

In addition, if desired, the compositions of the present invention can include up to about 15% by weight of glycerin. The glycerin serves as a polymerization inhibitor and retards decomposition or charring of the flux. When employed, the glycerin is preferably employed in amounts of about 5 to about 10% by weight.

Moreover, minor amounts (up to about 10% by weight) of other materials can be present in the composition. Examples of which include glycols, such as ethyleneglycol.

The remainder of the composition is substantially at least one water-soluble organic diluent. The preferred diluents are aliphatic alcohols containing 1-4 carbon atoms and cellosolves containing 1-4 carbon atoms. Examples of suitable alcohols and cellosolves include primary alcohols such as methyl alcohol, ethyl alcohol, isopropyl alcohol, n-propyl alcohol, isobutyl alcohol, and n-butyl alcohol, ethyl cellosolve (ethyleneglycolmonoethylether), methyl cellosolve (ethyleneglycolmonomethylether), and butyl cellosolve (ethyleneglycolmonobutylether). In the preferred aspects of the present invention, the diluent contains at least one alcohol and, most preferably, a mixture of an alcohol and a cellosolve.

The rosin flux compositions of the present invention can be used in any type of conventional soldering process and permits the soldering to be conducted at temperatures of about 375° F. to about 600° F. The soldering flux compositions of the present invention find particular application in the area of electronics for the soldering of copper plate, immersion tin, gold, and silver using any well-known solder. However, such use is merely illustrative and not restrictive as to the areas in which the present invention can be employed.

The flux is applied by any conventional process, such as by brushing, dipping, or spraying.

The following non-limiting examples are presented to further illustrate the present invention.

EXAMPLE 1

A non-activated soldering flux, in accordance with the present invention, having the following composition is prepared:
40% water-white rosin
0.1% FC-134 fluorocarbon surfactant
5% disodium ethylenediamine tetraacetic acid
54.9% of a mixture of 70% by weight of $C_1$-$C_4$ aliphatic primary monohydric alcohols and 30% by weight of $C_1$-$C_4$ cellosolves.

The above formulation is prepared by adding the FC-134 and disodium ethylenediaminetetraacetic acid to the alcohol mixture. The water white rosin powder is then added to complete the composition. The ingredients are mixed at ambient temperature to insure a homogeneous solution. The rosin employed is obtained in granular form and is ground to a powder consistancy.

The substrate is immersed in cold flux, followed by immersion in a 10/90 SnPb solder alloy at a solder pot temperature of 325°-350° C. for a period of 6 to 14 seconds. Following the solder operation, flux residues are removed by quenching the substrates by immersion into a mixture of ⅓ portion flux and ⅔ portion perchloroethane. This is followed by a vapor decrease using perchloroethane for final cleaning. The immersion or quench time is about 3 to 6 seconds. After soldering, it is observed that there is uniform solder flow, that good solder joints are promoted without corrosion, and no sputtering is noted during the soldering. A significant result is increased first pass soldered product yields requiring minimal or no rework. This is important in improving operation efficiency and reducing manufacturing costs.

EXAMPLE 2

Example 1 is repeated, except that the composition contains about 40% by weight of water-white rosin, about 0.1% by weight of FC-134, about 10% by weight of glycerin, about 5% by weight of pentasodiumdiethylenetriaminepentaacetic acid, and 44.9% by weight of a mixture of C1 to C4 primary aliphatic alcohols and C1 to C4 chain length cellosolves in a ratio of 70% alcohol to 30% cellosolve.

The results obtained are similar to those of Example 1.

EXAMPLE 3

Example 1 is repeated, except that the composition contains about 40% by weight of water-weight rosin, about 0.1% by weight of FC-134, about 10% by weight of glycerine, about 5% by weight of pentasodiumdiethylenetriaminepentaacetic acid, about 20% by weight of a mixture of 70% isopropyl alcohol and 30% methyl alcohol, and about 24.9% by weight of a mixture of about 35% by weight ethyleneglycolmonoethylether and about 65% by weight of ethyleneglycolmonobutylether.

The results obtained are similar to those of Example 1.

What is claimed is:

1. A soldering flux comprising:
   (A) about 40 to about 60% by weight of rosin,
   (B) about 1 to about 10% by weight of at least one of compound selected from the group of ethylenediaminetetraacetic acid, sodium salt thereof, diethylenetriaminepentaacetic acid, sodium salt thereof, or mixtures thereof;
   (C) about 0.1 to about 1% by weight of an ionic fluorocarbon surfactant; and
   (D) the remainder being substantially at least one water soluble organic diluent.

2. The flux of claim 1 wherein said rosin is water-white rosin.

3. The flux of claim 1 wherein said compound is selected from the group of disodium ethylenediamine tetraacetic acid, trisodium ethylenediaminetriacetic acid, tetrasodium ethylenediamine tetraacetate, pentasodium diethylenetriamine pentaacetate, ethylenediaminetetraacetic acid, and pentasodium diethylenetriamine pentaacetic acid, or mixtures thereof.

4. The flux of claim 1 wherein said compound is selected from the group of pentasodium diethylene triaminepentaacetic acid, disodium ethylenediamine tetraacetic acid, and mixtures thereof.

5. The flux of claim 1 wherein said compound is pentasodiumdiethylenetriaminepentaacetic acid.

6. The flux of claim 1 wherein said compound is disodiumethylenediaminetetraacetic acid.

7. The flux of claim 1 wherein said surfactant is cationic.

8. The flux of claim 1 wherein said ionic fluorocarbon surfactant is represented by the formula:

$$Y(CF_2)_p X$$

wherein X is a solubilizing group, Y is H or F and p is a positive integer.

9. The flux of claim 1 wherein said ionic fluorocarbon surfactant is represented by the formula:

$$C_n F_{2n+1} CONHC_3 H_6 N(CH_3)_q C_r H_{2r+1} X$$

wherein n is 6 to 9, q is 2 or 3, n is 0-2, X is halide.

10. The flux of claim 1 wherein said ionic fluorocarbon surfactant is $C_7H_{15}CONHC_3H_6N(CH_3)_2C_2H_5Cl$ or $C_7H_{15}CONHC_3H_6N(CH_3)_3I$ or mixtures thereof.

11. The flux of claim 1 wherein said ionic fluorocarbon surfactant includes $$F(CF_2)_7 CONHC_3 H_6 N(C_2 H_5)_2 CH_3 I.$$

12. The flux of claim 1 wherein said ionic fluorocarbon surfactant is $H(CF_2)_n COONH_4$ wherein n is 8 or 10.

13. The flux of claim 1 wherein said ionic fluorocarbon surfactant is $HCF_2(CF_2)_s COOM$ wherein s is 5–8 and M is hydrogen or a group required to form a salt.

14. The flux of claim 1 wherein said organic diluent contains a monohydric aliphatic alcohol containing 1–4 carbon atoms.

15. The flux composition of claim 13 wherein said diluent also contains a cellosolve containing 1–4 carbon atoms.

16. The flux of claim 1 wherein said organic diluent includes isopropyl alcohol and butyl cellosolve.

17. The flux of claim 1 wherein said diluent includes isopropyl alcohol and ethyleneglycolmonoethylether.

18. The flux of claim 1 which further contains glycerin.

19. The flux of claim 1 which further includes 1–15% by weight of glycerin.

20. The flux of claim 1 which includes about 5 to about 10% by weight of glycerin.

* * * * *